Aug. 9, 1949.　　　　　I. F. SCHRECK　　　　　2,478,327
PROPELLING UNIT FOR TRUCKS
Filed Aug. 3, 1944　　　　　　　　　　　　　　　　4 Sheets-Sheet 1
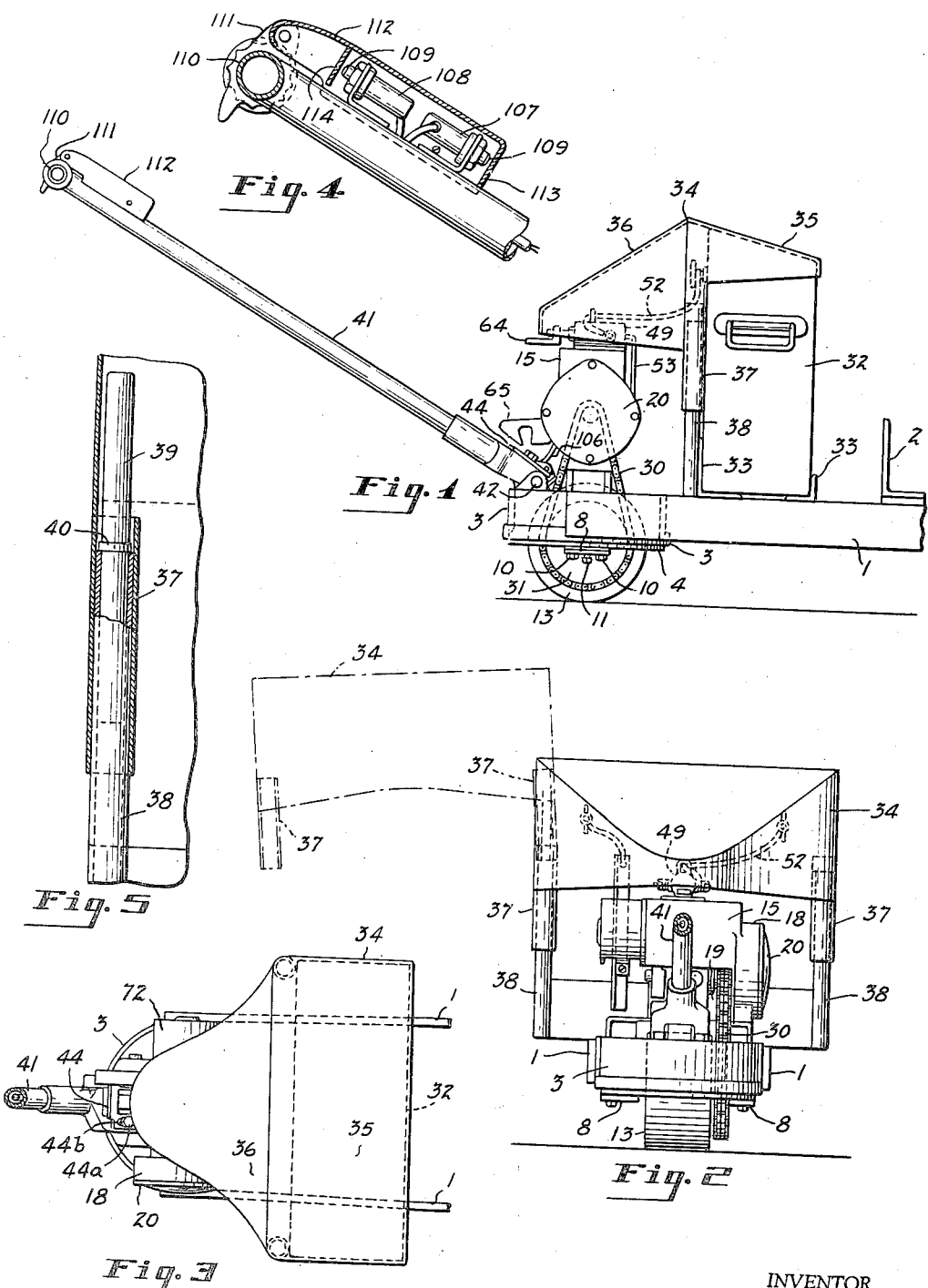
INVENTOR.
Irvin F. Schreck
BY Frank S. Greene
ATTORNEY

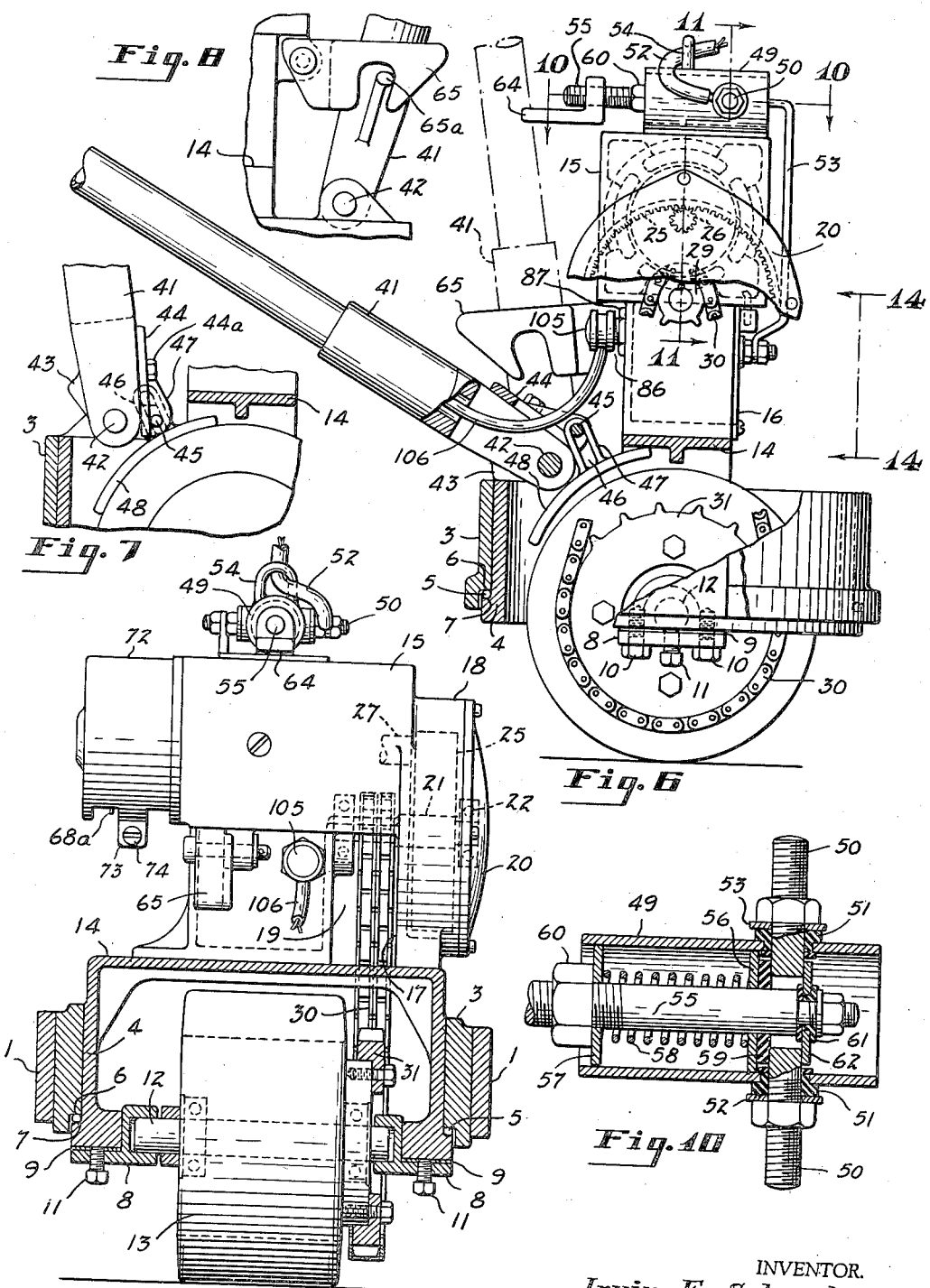

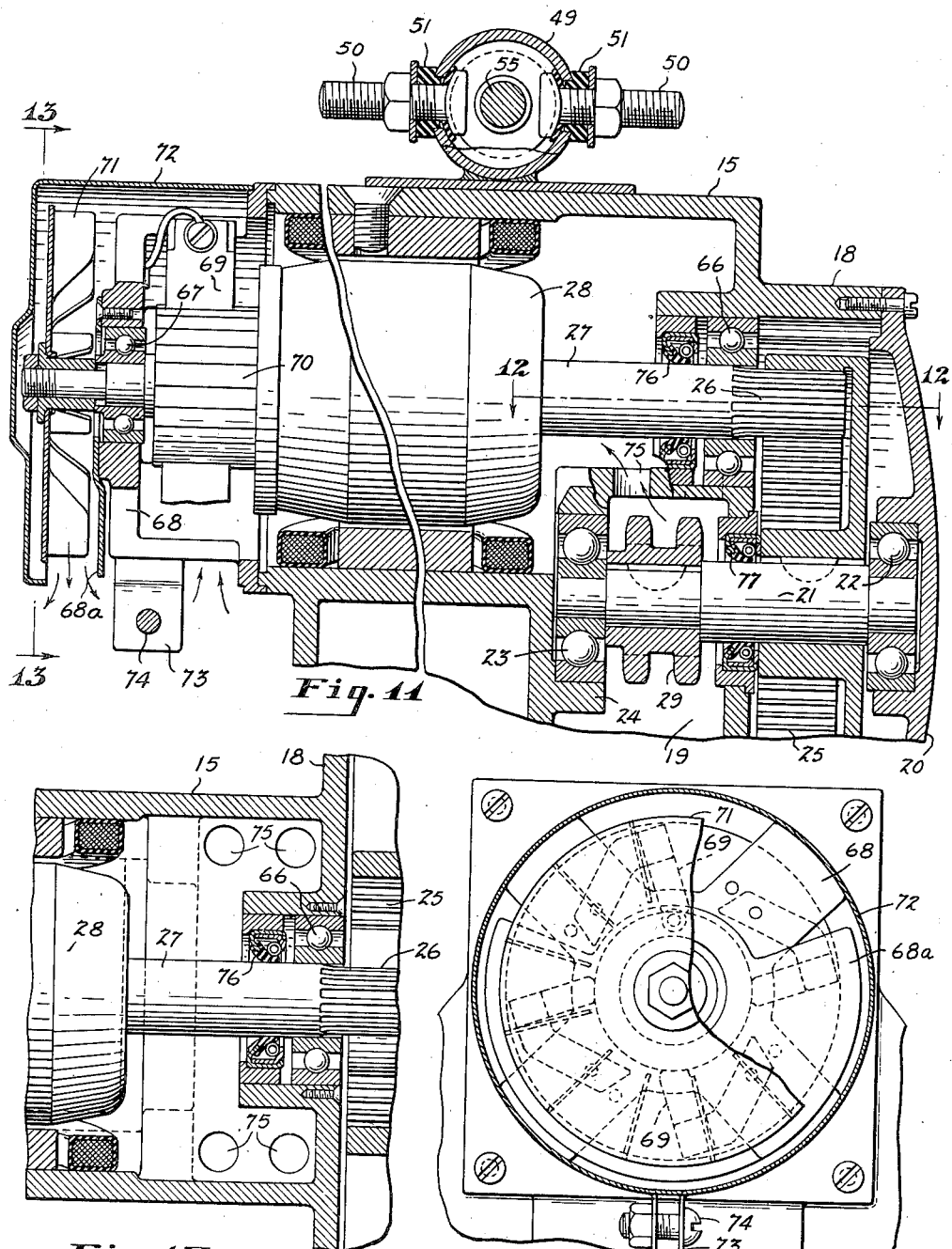

Aug. 9, 1949.  I. F. SCHRECK  2,478,327
PROPELLING UNIT FOR TRUCKS
Filed Aug. 3, 1944  4 Sheets-Sheet 4

INVENTOR.
Irvin F. Schreck
BY Frank S. Greene
ATTORNEY

Patented Aug. 9, 1949

2,478,327

UNITED STATES PATENT OFFICE 2,478,327

PROPELLING UNIT FOR TRUCKS

Irvin F. Schreck, Cleveland Heights, Ohio

Application August 3, 1944, Serial No. 547,930

3 Claims. (Cl. 180—19)

The present invention relates to trucks of the type disclosed in my Patent 2,209,356, granted July 30, 1940, in which a swiveled propelling unit is employed which has a draft tongue by means of which the truck may be steered by the operator while being propelled by the motor, which may be used, when desired, to move or assist in moving the truck and which carries manually operable motor controlling elements.

One object of the present invention is to provide a means for automatically opening the motor circuit to render the control mechanism ineffective whenever the draft tongue is moved to an upright position.

A further object of the invention is to provide a reversible electric motor and motor-controlling switches so arranged and combined that the motor windings cannot be damaged by short circuits in the wiring extending to the controlling switches.

A further object is to provide a compact and propelling unit of rugged and durable construction that may be quickly and easily assembled and having all parts easily accessible for replacement or repair.

Further objects are to provide motor-controlling switches that are conveniently accessible and readily detachable and to provide connections from a battery on the truck frame to solenoid operated motor-controlling switches on the propelling unit and from the solenoids to controlling switches on the draft tongue.

Additional objects are to provide means by which overheating of the motor is prevented and to provide means for adjusting the motor with respect to the traction wheel to apply the proper tension to the wheel drive chain.

With the above and other objects in view, the invention may be said to comprise the truck as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of the forward end of a truck embodying the invention;

Fig. 2 is a front elevation of the truck;

Fig. 3 is a top plan view of the forward portion of the truck;

Fig. 4 is a sectional view showing the motor control devices mounted on the draft tongue;

Fig. 5 is a fragmentary vertical section showing the hinge mounting of the cover;

Fig. 6 is a fragmentary side elevation on an enlarged scale, with portions of the truck and propelling unit frames broken away to show parts that would otherwise be concealed;

Fig. 7 is a fragmentary side elevation showing the brake in wheel-engaging position;

Fig. 8 is a fragmentary detail view showing the latch for holding the draft tongue in upright position in side elevation;

Fig. 9 is a front elevation on an enlarged scale, with a portion of the frames of the truck and propelling unit in section;

Fig. 10 is a horizontal section taken on the line indicated at 10—10 in Fig. 6;

Fig. 11 is a vertical section taken on the line indicated at 11—11 in Fig. 6;

Fig. 12 is a fragmentary horizontal section taken on the line indicated at 12—12 in Fig. 11;

Fig. 13 is a vertical section taken on the line indicated at 13—13 in Fig. 11;

Figure 14:
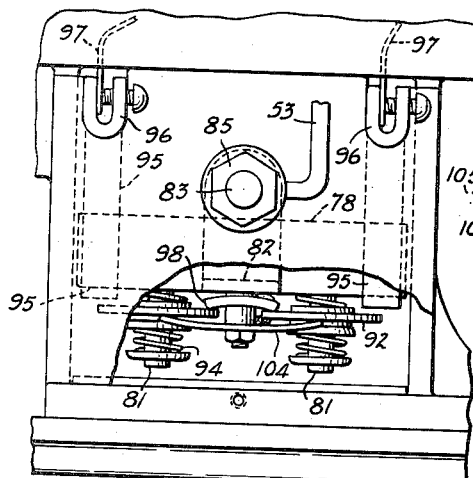
Fig. 14 is a rear elevation of the solenoid operated motor-controlling switch.
Figure 15:
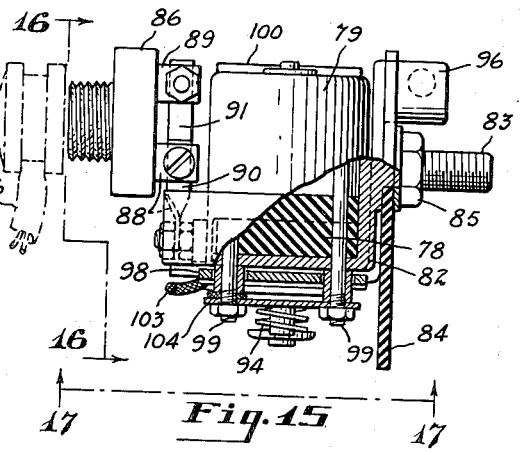
Fig. 15 is a side elevation of the switch with a portion broken away and shown in section.
Figure 16:
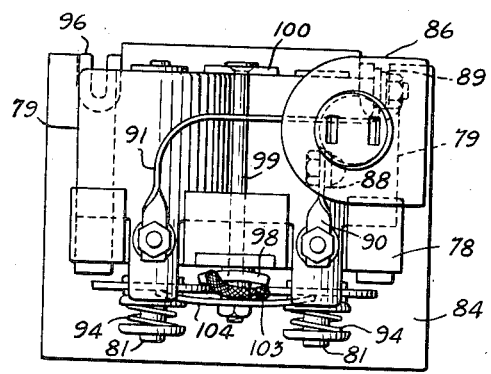
Fig. 16 is a front elevation of the switch, viewed as indicated at 16—16 in Fig. 15.
Figure 17:
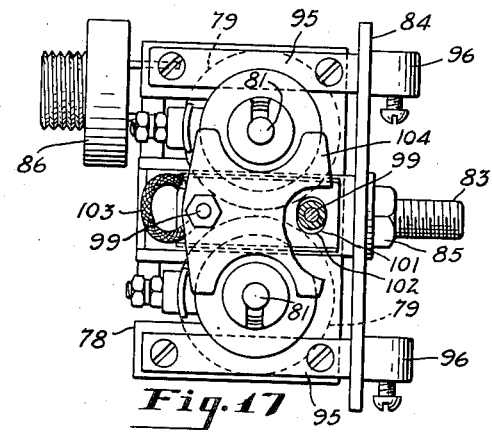
Fig. 17 is a bottom plan view of the switch, viewed as indicated at 17—17 in Fig. 15.

In the accompanying drawings, the invention is shown applied to a low-bodied truck of the lift type, such as is commonly used for transporting loading skids from place to place in factories or warehouses. The forward portion of a truck frame 1 together with the rear end portion of a load carrier 2 are shown in the drawings, the present invention being concerned primarily with the steering and propelling unit that is mounted at the forward end of the truck frame.

The truck frame 1 is provided at its forward end with an annular bearing portion 3, in which an annular propelling unit supporting frame 4 is rotatably mounted.

As best shown in Figs. 6 and 9 the forward end of the truck frame 1 is supported upon the propelling unit frame 4 by a ball bearing 5 interposed between an internal shoulder 6 on the bearing member 3 and an external shoulder 7 on the annulus 4 at its lower edge. At diametrically opposite points on the bottom edge of the annulus 4 bearing members 8 are mounted. Shims 9 are interposed between the bearing members 8 and the bottom of the annulus and the bearing members 8 are secured to the annulus by means of bolts 10. A set screw 11 is threaded in each of the bearing members 8 centrally thereof and bears against the underside of the annulus 4. The bearing members 8 support the opposite ends of an axle 12 and may be adjusted vertically by loosening the bolts 10 and adjusting the set screws 11. A traction wheel 13 is mounted on the axle 12 and the frame of the propelling unit has a horizontal cross member 14 positioned above the wheel directly over the axle and has its opposite ends integrally connected to the annulus 4.

The cross member 14 provides a support for a motor housing 15 which has an integral hollow pedestal 16 that serves as a switch box, and provides a support for a motor housing 15. The housing 15 is preferably mounted with its axis parallel with the axle 12 and is provided with an end wall 17 that is spaced from the pedestal 16 and extends down to the cross member 14. The end wall 17 has an integral, outwardly projecting, annular flange 18 and provides a recess 19 at one side of the pedestal 16. A circular cap 20 is secured to the flange 18 to provide a gear housing at the end of the motor casing. A shaft 21 is journaled in a bearing 22 disposed centrally of the cap 20 and in a bearing 23 mounted in the motor housing adjacent the top of the pedestal 16. An internal gear 25 is fixed to the shaft 21 within the gear housing and meshes with a gear 26 on the shaft 27 of an electric motor 28 mounted in the housing 15. The shafts 21 and 27 are parallel with the axle 12 and the shaft 21 has a sprocket 29 fixed thereto and positioned in the recess 19. A drive chain 30 extends over the sprocket 29 and over a sprocket 31 on the wheel 13. The motor 28 drives the wheel 13 through the gears 26 and 25 and through the sprocket chain 30, and proper tension may be applied to the chain 30 by adjusting the bearings 8 with respect to the annulus 4.

An electric storage battery 32 is mounted on the forward end portion of the truck frame 1 immediately to the rear of the bearing portion 3, the battery 32 being mounted in angle bar seating members 33 secured on the frame and suitable means, which will hereinafter be described in detail, are provided for conducting current from the battery to the motor 27. A cover 34 having a rear portion 35 overlying the battery 32 and a forward portion 36 overlying the propelling unit is supported on the truck frame by means of vertical sleeves 37 rigidly attached thereto at opposite sides thereof that are slidable on tubular upright posts 38 attached to opposite sides of the frame 1 immediately adjacent the bearing member 3. One of the posts 38 has an extension in the form of a round bar 39 fitting therein and having a flange 40 that rests on the top of the post. The bar 39 provides a pivot on which the cover 34 may be swung to a position at one side of the truck, clear of the battery and propelling unit, as shown in dotted lines in Fig. 2, when it is desired to obtain access to these members.

A suitable draft tongue 41 is connected to the annulus 3 by a horizontal pivot 42 disposed forwardly of and below the cross member 14, the pivot 42 being parallel to the axle 12. The draft tongue 41 can be swung upwardly to a substantially upright position in front of the motor casing 15 and carries a lug 43 on its underside which engages with the annulus 4 to limit its downward movement. The tongue 41 has a bracket 44 adjustably attached thereto adjacent the pivot 42 by means of bolts 44a extending through a slot 44b in the bracket 44 shown in Fig. 3 and this bracket carries a laterally projecting pin 45 that engages in a slot 46 formed in an arm 47 projecting upwardly from a brake shoe 48. When the draft tongue 41 is in the position shown in Fig. 6, the brake shoe 48 is supported by the pin 45 in a position clear of the wheel 13. When the draft tongue 41 is swung to an upright position, as shown in Fig. 7, the shoe 48 is lowered into engagement with the wheel 13 and the pin 45 engages the lower end of the slot 46 to press the brake shoe against the wheel. During the operation of the truck, the handle 41 is normally supported in the position shown in Fig. 6, but if the truck travels faster than the operator, the backward pressure exerted by the operator on the outer end of the tongue will swing the handle to upright position and the brake will be applied.

Means is also provided for automatically opening the motor circuit to stop the motor when the tongue 41 is moved to upright position.

As shown in Figs. 1, 6 and 9, a switch casing 49 is mounted upon the top of the motor housing 15. The casing 49 is of cylindrical form and is positioned with its axis disposed transversely with respect to the motor shaft and the wheel axle. As best shown in Fig. 10, terminals 50 are secured at diametrically opposite points to the wall of the cylindrical casing 49, the terminals 50 being insulated from the casing 49 by collars 51 of insulating material. A suitably insulated wire 52 connects one of the terminals 50 to the battery 32 and an insulated wire 53 extends from the opposite terminal 50 to the pedestal 16. The terminals 50 are spaced laterally from the central vertical axis of the propelling unit and in order to protect the end of the wire 52 attached to the terminal 50 against twisting strains, an eyelet 54, which has an opening of a size but slightly larger than the insulated wire, is fixed to the top of the casing 49 substantially at the vertical axis of the propelling unit, so that the flexing of the wire 52 during the swivelling movements of the propelling unit is confined to the portion of the wire extending from the eyelet 54 to the battery.

An axially movable plunger 55 is mounted in the casing 49 and carries spaced disks 56 and 57 that have a sliding fit in the casing and in the plunger. A coil spring 58 is interposed between the disks 56 and 57 and this spring presses the rear disk 56 against a disk 59 of insulating material that engages the contact members 50. The forward disks 57 is held by the spring 58 against a nut 60 on the plunger. By adjusting the nut 60 the tension of the spring 58 may be adjusted. The rear end of the plunger 55 carries a collar 61 of insulating material that is clamped to the plunger and which carries a contact disk 62 of conductive material that is adapted to engage the two contact members 50. The spring 58 serves to normally hold the plunger 55 in its forward position with the contact disk 62 in circuit closing position in engagement with the contact members 50. The plunger 55 is positioned in the path of movement of the draft tongue 41 and has an adjustable abutment member 64 threaded on its forward end that is engaged by the draft tongue 41 as the tongue approaches its upright position to move the plunger 55 rearwardly and shift the contact disk 62 out of engagement with the contact members 50. The actuation of the plunger 55 serves to break the motor circuit so that the motor stops substantially simultaneously with the application of the brake. The draft tongue 41 preferably is latched in its upright position to hold the motor circuit open and to apply the brake during intervals when the truck is not in use, a suitable latch 65 being provided on the propelling unit which engages with a laterally projecting lug 65a on the draft tongue, as shown in Fig. 3 of the drawing.

As shown in Fig. 11, the motor housing 15 is provided with a bearing 66 for the motor shaft 27, which supports the shaft adjacent the gear 26. Adjacent the opposite end of the housing, the shaft is supported by a second bearing 67 that is mounted in a spider 68 that provides supports for brushes 69 of a commutator 70 on the shaft 27. The shaft 27 has a reduced end extending past the bearing 67 to which a fan 71 is attached. The commutator and fan are enclosed by a sheet metal housing member 72 that forms an extension of the housing 15, the housing member 72 being of cylindrical form with a closed end and an axially extending opening at the bottom thereof. The housing 72 is clamped on the spider 68, the sheet metal body thereof being provided with extending arms 73 at opposite edges of the bottom opening that are connected by clamping bolts 74. An arcuate sheet metal plate 68a is attached to the spider 68 and forms an inner fan casing wall partitioning the lower half of the fan from the inner portion of the housing 72 and causing air to enter the upper portion of the fan and to be discharged downwardly through the bottom opening. Suction created by the fan 71 draws some air through the bottom opening of the housing 72 and upwardly around the commutator 70 to the upper portion of the fan. Adjacent the opposite end thereof the housing 15 is provided with openings 75 to the recess 19, so that during operation of the motor the fan 71 also draws air upwardly through the openings 75 and laterally through the space between the armature and field windings of the motor 28 and over the commutator 70, discharging the air downwardly through the peripheral opening at the bottom of the housing member 72. The motor is thus effectively cooled during operation.

The gear housing formed between the end wall 17 of the housing 15 and the cap 21 is preferably sealed to retain lubricant, an oil sealing ring 76 being provided in the wall of the housing 15 inwardly of the bearing 66, and a second oil sealing ring being provided on the shaft 27 in the opening through the wall 17.

The hollow pedestal 16 is of rectangular cross section and is open at the rear side to provide a compartment in which a motor-controlling switch may be removably mounted. The motor-controlling switch is in the form of a unit that may be inserted into or removed from pedestal 16 and as shown in Figs. 14 to 18, inclusive, the switch is mounted upon an insulating block 78 which is of a size to fit within the pedestal 16.

The block 78 has a pair of solenoids 79 mounted side by side with their axes vertical upon the top thereof and is provided with slots 80 through which the armature 81 of the solenoids 79 extend. An angle-shaped contact member 82 extends across the insulating block 78 and upwardly along the rear side thereof, the upwardly extending portion of the contact member 82 being provided with an integral terminal post 83 that projects laterally therefrom. The post 83 is threaded and passes through an aperture in a closure member 84 formed of insulating material that is of a size to close the open side of the pedestal 16. The closure member 84 is clamped against the block 78 and the contact member 82 by means of a nut 85 on the terminal post 83. The terminal post 83 provides a connection for the lower end of the wire 53 that extends downwardly from the safety switch 49 on top of the motor housing. Attached to the insulating block 78 on the front side thereof, there is a socket member 86 of insulating material that has a threaded portion extending through an opening in the front wall of the pedestal 16, the socket member being clamped to the front wall by means of a nut 87, as shown in Fig. 6. The socket 86 has terminals 88 and 89 that are connected to conductors 90 and 91 that extend to terminals of the solenoids 79.

A contact disk 92 is yieldably mounted upon each of the solenoid armatures 81, the disks 92 being yieldably supported on the armatures between upper and lower coil springs 93 and 94. The contact disks 92 serve to connect the main contact member 82 with either of two auxiliary contact members 95 extending across the bottom of the insulating block 78 at opposite ends thereof. The contact members 95 have clamping terminals 96 which connect the contacts 95 with conductors 97 leading to field windings of the motor 28, contacts 92 serving to direct current to one or the other of two motor windings arranged to drive the motor 28 in opposite directions.

It is desirable that means be provided to prevent simultaneous supply of current to both the forward and reverse field windings and means is, therefore, provided for preventing the engagement of both contact disks 92 with the contacts 95 in the event that both solenoids 79 should be simultaneously energized due to a short circuit or other cause. To prevent such simultaneous engagement, the two disks 92 engage with a rocker plate 98 positioned beneath the contact member 82 by bolts 99 extending downwardly through the insulating block 78, the bolts being anchored to a plate 100 supported upon the tops of the solenoids 79 and extending through openings 101 in the plate 98 that are large enough to permit a limited rocking movement of the plate 98. The plate 98 is insulated from the bolts 99 by means of insulating sleeves 102 on the lower ends of the bolts. The plate 98 contacts with the under surface of the contact member 82 and is also conductively joined to the plate 82 by means of a pigtail 103.

The contact disks 92 are positioned by an arched retaining plate 104 supported by the bolts 99 at their lower ends, that has end portions in engagement with the undersides of said disks to ensure proper engagement of the disks with the rocker plate 98. Actuation of one of the solenoids causes one of the disks 92 to be drawn upwardly into engagement with one of the contact members 95 while the rocker plate 98 is rocked upon the center contact plate 82 to press the other disk 92 downwardly away from the contact member 95 at the opposite end of the block 78. One of the contact members is thus positively held out of engagement while the other is engaged. Should both solenoids be simultaneously energized, the rocker plate 98 serves to hold both contact disks 92 out of engagement with the contact strips 95 so that the forward and reverse windings of the motor cannot be simultaneously energized.

Figure 19:
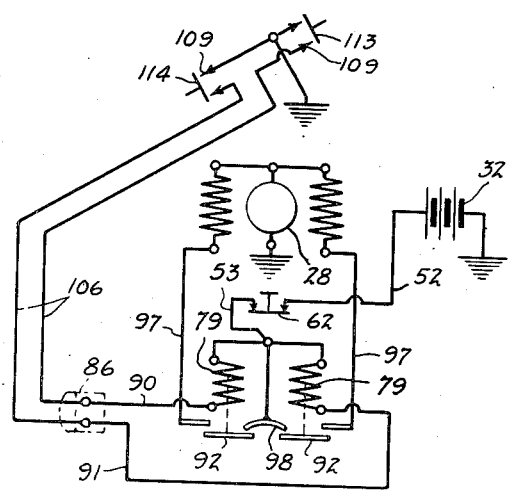
Fig. 19 is a wiring diagram showing the motor-controlling circuits.
Figure 18:
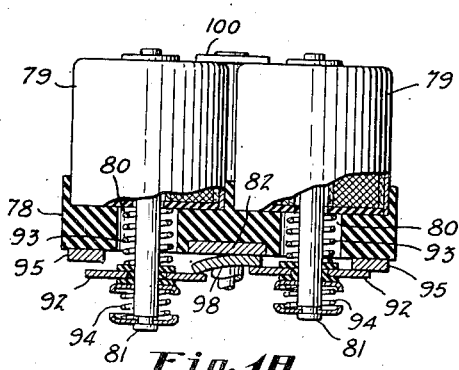
Fig. 18 is a sectional elevation illustrating the action of the switch.

The socket 86 that projects through the front wall of the pedestal 16 is adapted to receive a plug 105 carried by insulated wires 106 that extend into the draft tongue 41 adjacent the pivot as shown in Fig. 6. The draft tongue is preferably tubular so that the wires 106 may extend within the tongue into the outer end thereof. Adjacent the outer end of the draft tongue two oppositely disposed switches 107 and 108 are provided. These switches are normally open and are provided with plungers 109 which are movable to close the switches. As shown in Fig. 19, these switches are so connected to the wires 106 that each of the solenoids 79 is controlled by one of the two switches.

The draft tongue 41 is provided at its outer end with a laterally projecting handle provided with a rotatable sleeve 110, which carries a lever 111 attached to a cover plate 112 that extends over the switches 108 and 109 and has slidable engagement with the tongue 41. The member 112 has a downwardly projecting end portion 113 that is adapted to engage with the plunger 109 of the switch 107 and adjacent its outer end has a downwardly projecting member 114 that is adapted to engage with the plunger 109 of the switch 108. When the lever 111 is swung forwardly, the end member 113 of the cover 112 engages with the plunger 109 of the switch 107, closing the circuit of the solenoid 79 that controls the motor winding that causes the motor to be driven in a direction to propel the truck in a forward direction. When the sleeve 110 is turned in a direction to move the lever 111 rearwardly, the switch 108 is closed to cause the truck to be propelled in a rearward direction.

It is to be understood that variations and modifications of the specific device herein shown and described for purposes of illustration, may be made without departing from the spirit of the invention.

What I claim is:

1. In combination with a truck having a frame, a propelling unit swiveled to said frame, said propelling unit comprising a frame having an electric motor mounted thereon, a wheel beneath said motor, a driving connection from the motor to the wheel, a draft tongue pivoted to the frame of the propelling unit forwardly of and below the motor to swing about an axis parallel to the axis of the wheel, said tongue being movable to a substantially upright position in front of the motor, a circuit for said motor, a normally closed switch in the motor circuit, and a circuit breaker including a member mounted upon the top of the motor casing for movement in a direction transverse to the wheel axis, said member having an adjustable forward end portion in the path of said tongue.

2. In combination with a truck having a frame with an annular bearing member at its forward end, a propelling unit comprising an annulus adapted to be rotatably mounted in said annular bearing member, an axle mounted in said annulus, a wheel on said axle, a support extending across the annulus above the wheel and connected at its ends to the annulus, an electric motor having a casing with a hollow pedestal mounted upon said support, a driving connection from the motor to said wheel, a draft tongue pivoted to the annulus below the motor and forwardly thereof to swing about an axis parallel to said axle, a battery on the truck frame adjacent the propelling unit, a circuit for said motor including a normally open controlling switch mounted in said pedestal and a normally closed safety switch mounted upon the top of the motor casing, a conductor extending from the battery to the safety switch and a conductor from the safety switch to said controlling switch, a solenoid in the pedestal for actuating the controlling switch, a solenoid circuit including wires extending from the solenoid to the draft tongue adjacent its pivot, a manually operable switch on the draft tongue adjacent its forward end for controlling the solenoid, and a member movably mounted on the motor casing and positioned to be engaged by the draft tongue as it approaches an upright position for opening said safety switch.

3. In combination with a truck frame, a propelling unit having a frame swiveled in the truck frame to turn about a vertical axis, the swiveled frame having a horizontal supporting member, a traction wheel mounted in the frame beneath said supporting member, an electric motor having a casing with a hollow pedestal mounted on said supporting member, a motor controlling switch mounted in said hollow pedestal and having an actuating solenoid, a socket in a wall of said pedestal and wires connecting the solenoid to the socket, a draft tongue pivoted to said swiveled frame to swing vertically, a manually operable switch on said tongue and wires connected to said switch and to a plug engageable with said socket.

IRVIN F. SCHRECK.

REFERENCES CITED

The following references are of record in the file of this patent:

UNITED STATES PATENTS

| Number | Name | Date |
|---|---|---|
| 1,330,084 | Marsh | Feb. 10, 1920 |
| 1,476,173 | Osborn | Dec. 4, 1923 |
| 1,734,851 | Ellis | Nov. 5, 1929 |
| 1,971,199 | Owens | Aug. 21, 1934 |
| 2,070,288 | Mack | Feb. 9, 1937 |
| 2,138,239 | Irgens | Nov. 29, 1938 |
| 2,203,735 | Mack | June 11, 1940 |
| 2,209,356 | Schreck | July 30, 1940 |
| 2,325,396 | Hastings, Jr. | July 27, 1943 |
| 2,327,583 | Framhein | Aug. 24, 1943 |
| 2,399,605 | Schroeder | Apr. 30, 1946 |
| 2,401,113 | Schroeder | May 28, 1946 |